(12) United States Patent
Mohammed et al.

(10) Patent No.: US 11,982,234 B1
(45) Date of Patent: May 14, 2024

(54) HEAT EXCHANGER WITH BYPASS VALVE AND THERMAL FUSE

(71) Applicant: PRATT & WHITNEY CANADA CORP., Longueuil (CA)

(72) Inventors: Kashif Mohammed, Brossard (CA); Benjamin Renaud, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/168,173

(22) Filed: Feb. 13, 2023

(51) Int. Cl.
| | |
|---|---|
| *F02C 7/224* | (2006.01) |
| *F02C 7/14* | (2006.01) |
| *F02C 7/16* | (2006.01) |
| *F16K 17/40* | (2006.01) |
| *F28F 27/02* | (2006.01) |

(52) U.S. Cl.
CPC ............... *F02C 7/224* (2013.01); *F02C 7/14* (2013.01); *F02C 7/16* (2013.01); *F16K 17/40* (2013.01); *F28F 27/02* (2013.01); *F05D 2220/323* (2013.01); *F05D 2240/35* (2013.01); *F05D 2260/213* (2013.01)

(58) Field of Classification Search
CPC .... F23R 3/286; F23R 3/34; F23R 3/12; F23R 2900/00002; F23C 2900/9901; B05B 1/14; F23D 14/02; F23D 14/70; F23D 14/78
See application file for complete search history.

(56) References Cited

U.S. PATENT DOCUMENTS

| | | | | |
|---|---|---|---|---|
| 4,981,260 | A | 1/1991 | Beiser | |
| 5,000,464 | A * | 3/1991 | Yasui | F01P 7/16 |
| | | | | 277/599 |
| 5,746,170 | A * | 5/1998 | Moriya | F01M 5/005 |
| | | | | 123/196 AB |
| 6,485,255 | B1 * | 11/2002 | Care | F01D 25/12 |
| | | | | 415/12 |
| 6,994,784 | B2 * | 2/2006 | Jainek | B01D 35/147 |
| | | | | 210/DIG. 17 |
| 7,299,994 | B2 | 11/2007 | Brown et al. | |
| 9,890,868 | B2 * | 2/2018 | Diaz | F16K 31/002 |
| 10,132,401 | B2 * | 11/2018 | Gooden | F01M 5/007 |

(Continued)

FOREIGN PATENT DOCUMENTS

WO  WO03/042517 A1  5/2003

*Primary Examiner* — Craig Kim
(74) *Attorney, Agent, or Firm* — NORTON ROSE FULBRIGH CANADA LLP

(57) ABSTRACT

A heat exchanger, has: a heat exchanger core having an inlet, an outlet, at least one first conduit connecting the inlet to the outlet, and at least one second conduit in heat exchange relationship with the at least one first conduit; a bypass conduit connecting the inlet to the outlet while bypassing the at least one first conduit; and a valve in communication with the bypass conduit and having: a valve member movable between a closed position in which fluid communication through the valve and via the bypass conduit is blocked and an open position in which fluid communication through the bypass conduit and through the valve is permitted, the valve member defining an auxiliary passage, and a thermal fuse overlapping the auxiliary passage and blocking fluid communication through the valve member via the auxiliary passage, the thermal fuse having a melting temperature above a predetermined temperature of the fluid.

16 Claims, 4 Drawing Sheets

(56) References Cited

U.S. PATENT DOCUMENTS

| | | | |
|---|---|---|---|
| 10,590,799 B2* | 3/2020 | Zebian | F01D 17/085 |
| 2009/0026405 A1* | 1/2009 | Sheppard | G05D 23/1333 |
| | | | 251/364 |
| 2010/0116465 A1* | 5/2010 | Jainek | F28F 27/02 |
| | | | 29/726 |
| 2012/0090815 A1* | 4/2012 | Cameron | F16K 31/002 |
| | | | 251/337 |
| 2013/0055991 A1* | 3/2013 | Browne | F02M 26/26 |
| | | | 123/568.12 |
| 2015/0083367 A1* | 3/2015 | Diaz | F02K 3/115 |
| | | | 165/103 |
| 2016/0131035 A1* | 5/2016 | Diaz | F28D 7/08 |
| | | | 165/96 |
| 2023/0258098 A1* | 8/2023 | Ozog | B64D 27/10 |
| | | | 60/751 |

* cited by examiner

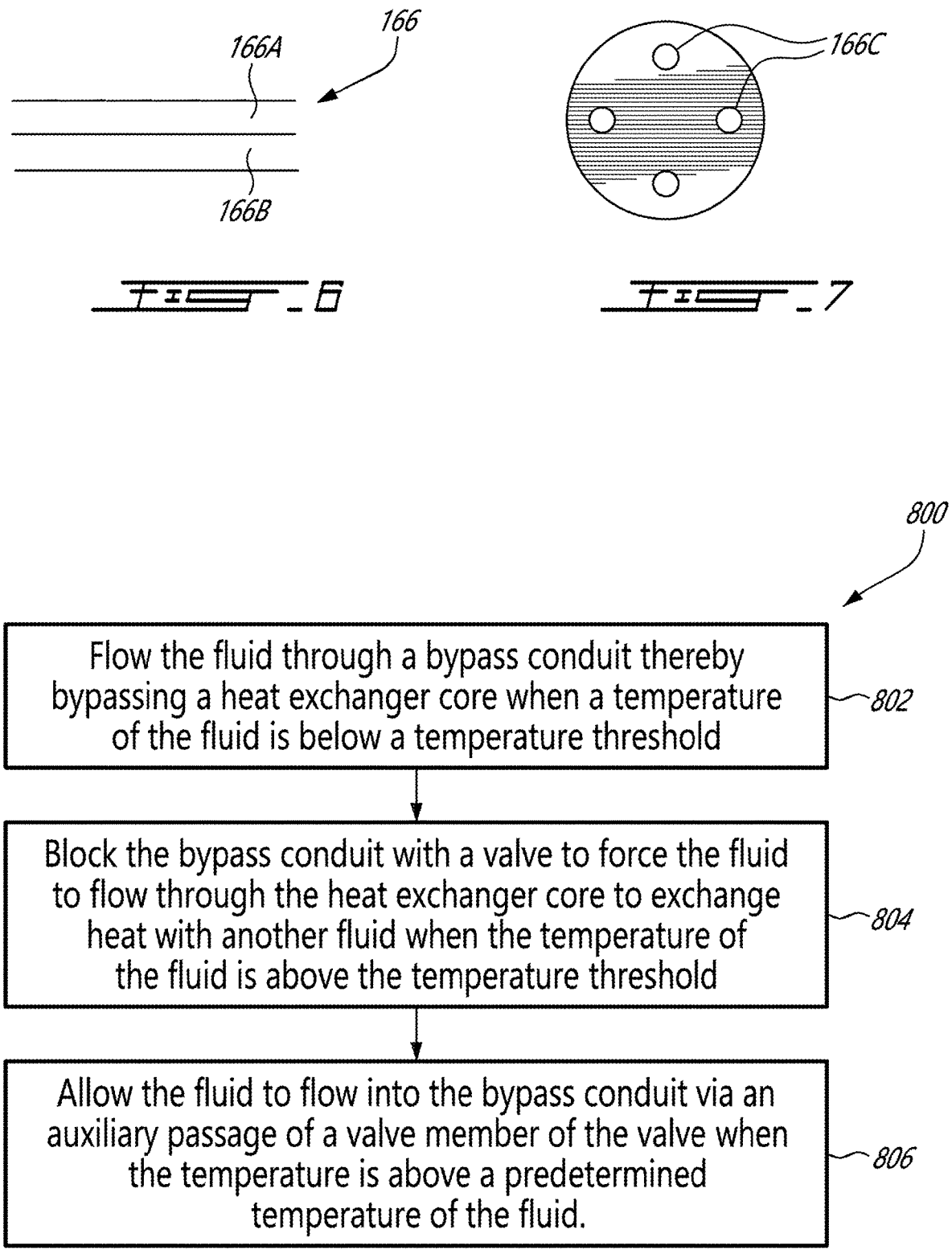

HEAT EXCHANGER WITH BYPASS VALVE AND THERMAL FUSE

TECHNICAL FIELD

The application relates generally to aircraft engines and, more particularly, to heat exchangers used in such engines.

BACKGROUND

An aircraft engine is equipped with heat exchangers, for instance with a fuel-oil heat exchanger, to transfer heat from hot oil to cold fuel before feeding said fuel to a combustor for combustion. When certifying the heat exchanger, fluid operating conditions considered for fire safety may result in situations whereby the flow may be stagnant at some locations. Temperature of the fluid at these locations may become higher than desired. Improvements are therefore sought.

SUMMARY

In one aspect, there is provided a heat exchanger, comprising: a heat exchanger core having an inlet, an outlet, at least one first conduit fluidly connecting the inlet to the outlet, and at least one second conduit in heat exchange relationship with the at least one first conduit; a bypass conduit fluidly connecting the inlet to the outlet while bypassing the at least one first conduit; and a valve in fluid communication with the bypass conduit, the valve having: a valve member movable between a closed position in which fluid communication through the valve and via the bypass conduit is blocked by the valve member and an open position in which fluid communication through the bypass conduit and through the valve is permitted by the valve member, the valve member defining an auxiliary passage, and a thermal fuse overlapping the auxiliary passage and blocking fluid communication through the valve member via the auxiliary passage, the thermal fuse having a melting temperature above a predetermined temperature of the fluid.

The heat exchanger described above may include any of the following features, in any combinations.

In some embodiments, the thermal fuse is in a solid state and blocks the auxiliary passage when a temperature of the fluid is below the predetermined temperature and in a liquid state when the temperature is above the predetermined temperature.

In some embodiments, the valve member is in the closed position when a temperature of the fluid is above a first threshold less than the predetermined temperature of the fluid.

In some embodiments, the valve member is a poppet valve.

In some embodiments, the auxiliary passage is an aperture defined through the poppet valve.

In some embodiments, the thermal fuse is contained within the aperture.

In some embodiments, the thermal fuse includes one or more of wax, plastic, and a soldering material.

In some embodiments, the valve includes an actuator engaged to the valve member, the actuator being a passive actuator moving the valve member between the closed position and the open position as a function of the temperature of the fluid.

In another aspect, there is provided an aircraft engine, comprising: a fuel-oil heat exchanger, having: a heat exchanger core having an inlet, an outlet, at least one first conduit fluidly connecting the inlet to the outlet, and at least one second conduit in heat exchange relationship with the at least one first conduit; a bypass conduit fluidly connecting the inlet to the outlet while bypassing the at least one first conduit; and a valve in fluid communication with the bypass conduit, the valve having: a valve member movable between a closed position in which fluid communication through the valve and via the bypass conduit is blocked by the valve member and an open position in which fluid communication through the bypass conduit and through the valve is permitted by the valve member, the valve member defining an auxiliary passage, and a blocking device overlapping the auxiliary passage and blocking fluid communication through the valve member via the auxiliary passage, the blocking device offset from the auxiliary passage when a temperature of fuel or oil flowing through the heat exchanger core is above a predetermined temperature of the fuel or the oil.

The aircraft engine described above may include any of the following features, in any combinations.

In some embodiments, the blocking device is a thermal fuse being in a solid state and blocking the auxiliary passage when the temperature of the fuel or the oil is below the predetermined temperature and in a liquid state when the temperature is above the predetermined temperature.

In some embodiments, the auxiliary passage is an aperture defined through the valve member.

In some embodiments, the thermal fuse is contained within the aperture.

In some embodiments, the thermal fuse includes one or more of wax, plastic, and a soldering material.

In some embodiments, the valve member is in the closed position when the temperature is above a first threshold less than the predetermined temperature.

In some embodiments, the valve member is a poppet valve.

In some embodiments, the valve includes an actuator engaged to the valve member, the actuator being a passive actuator moving the valve member between the closed position and the open position as a function of the temperature.

In some embodiments, the blocking device is a bi-metallic member having a first layer made of a first material and a second layer made of a second material having a coefficient of thermal expansion different than that of the first material, the bi-metallic member having a first shape when the temperature is below the predetermined temperature and a second shape when the temperature is at or above the predetermined temperature, the bi-metallic member blocking the auxiliary passage when in the first shape and offset from the auxiliary passage when in the second shape.

In yet another aspect, there is provided a method of mitigating effects of excessive temperature of a fluid flowing through a heat exchanger, comprising: flowing the fluid through a bypass conduit thereby bypassing a heat exchanger core when a temperature of the fluid is below a temperature threshold; blocking the bypass conduit with a valve to force the fluid to flow through the heat exchanger core to exchange heat with another fluid when the temperature of the fluid is above the temperature threshold; and allowing the fluid to flow into the bypass conduit via an auxiliary passage of a valve member of the valve when the temperature is above a maximum operating temperature of the fluid.

The method described above may include any of the following features, in any combinations.

In some embodiments, the allowing of the fluid to flow into the bypass conduit via the auxiliary passage includes melting a thermal fuse overlapping the auxiliary passage, the thermal fuse having a melting point above the maximum operating temperature of the fluid.

In some embodiments, the allowing of the fluid to flow in to the bypass conduit via the auxiliary passage includes changing a shape of a bi-metallic member from a first shape in which the bi-metallic member blocks the auxiliary passage to a second shape in which the bi-metallic member is offset form the auxiliary passage.

BRIEF DESCRIPTION OF THE DRAWINGS

Reference is now made to the accompanying figures in which:

FIG. 6 is a cross-sectional view of a bi-metallic member of the valve of FIG. 5 illustrating a layered structure thereof;

FIG. 7 is a top view of the bi-metallic member of FIG. 6; and

FIG. 8 is a flowchart illustrating steps of a method of mitigating effects of excessive temperature of a fluid flowing through the heat exchanger of FIG. 2.

DETAILED DESCRIPTION

Figure 1:
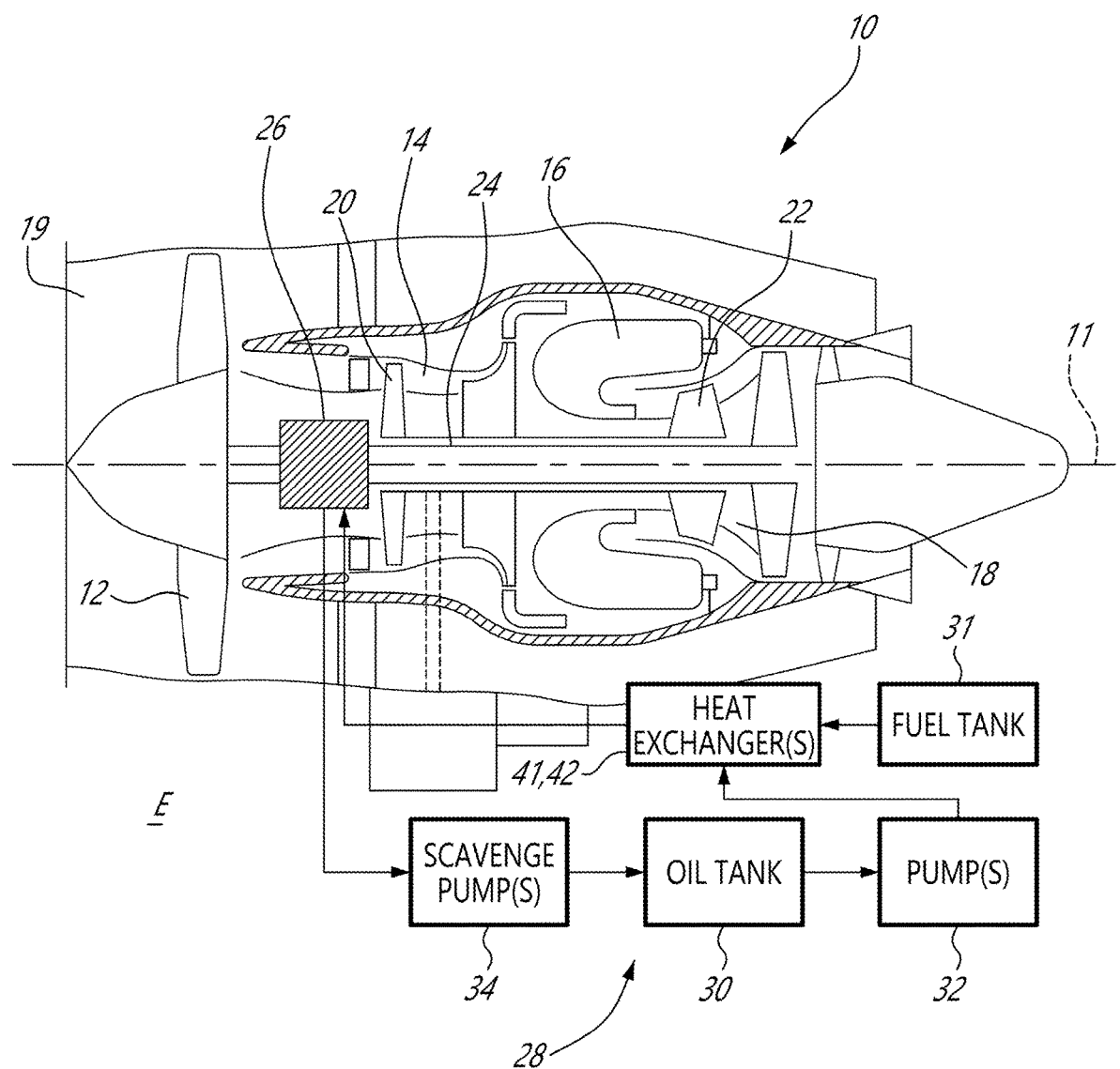
FIG. 1 is a schematic cross sectional view of an aircraft engine depicted as a gas turbine engine in accordance with one embodiment.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. More specifically, the gas turbine engine 10 has a core gas path including an intake 19 for receiving air. The compressor section 14 has at least one compressor 20 extending across the core gas path and the turbine section 18 has at least one turbine 22 extending across the core gas path, with the at least one compressor 20 and the at least one turbine 22 being rotatable with a rotary shaft 24 supported within the gas turbine engine 10 by bearings 26 (only one being shown for illustration purposes). An oil system 28 is provided for circulating oil to the bearings 26 and back to an oil reservoir 30. It will be appreciated that the principles of the disclosure apply to any aircraft engines, such as internal combustion engines (e.g., piston engine, rotary engine), any type of gas turbine engines, (e.g., turbofan, turboshaft, and turboprop), and auxiliary power unit.

The oil system 28 includes a fuel-oil heat exchanger (FOHE) 41 and an air-cooled oil cooler (ACOC) 42. The FOHE 41 is used to exchange heat between the oil and fuel to be supplied to the combustor 16 and the ACOC 42 is used to transfer heat from the oil to ambient air of an environment outside the gas turbine engine 10. In use, oil is drawn from the oil reservoir 30 via a pump 32, flows through the FOHE 41 and ACOC 42, is injected into one or more bearing housing for lubricating the bearings 26, and is scavenged back to the oil reservoir 30 via a scavenge pump 34.

Figure 2:
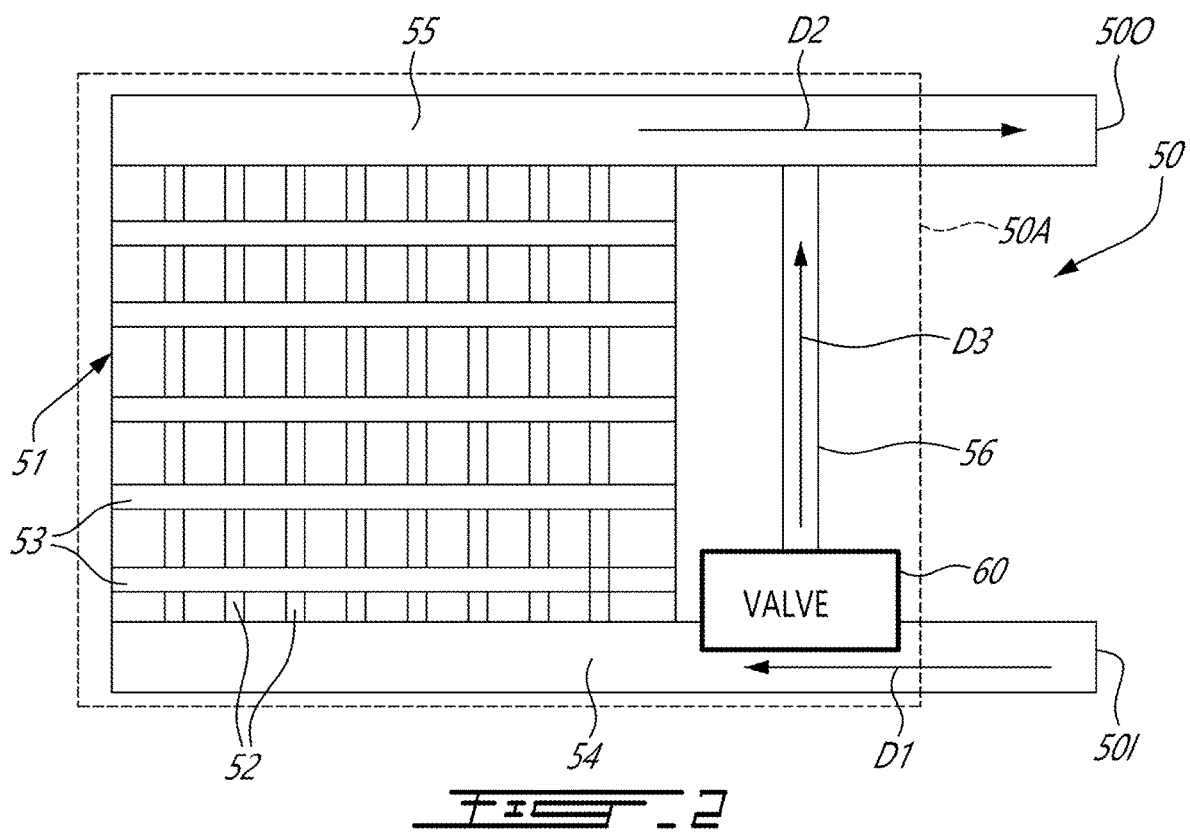
FIG. 2 is a schematic view of a heat exchanger in accordance with one embodiment for the aircraft engine of FIG. 1.

Referring now to FIG. 2, a heat exchanger is shown at 50. The heat exchanger 50 may correspond to any of the FOHE 41, the ACOC 42, or any other heat exchanger of the aircraft engine of FIG. 1. The heat exchanger 50 may be contained within a housing 50A. The heat exchanger 50 includes a heat exchanger core 51, having at least one first conduit 52 and at least one second conduit 53 in heat exchange relationship with the at least one first conduit 52. The at least one first conduit and at least one second conduit include a plurality of first conduits and a plurality of second conduits in this embodiment. The at least one first conduit 52 may flow the oil whereas the at least one second conduit may flow the fuel. The at least one first conduit 52 of the heat exchanger core 51 receives the fluid (e.g., fuel, oil) to be cooled via an inlet conduit 54 along direction D1 and the fluid exiting the at least one first conduit 52 is flown back towards other components via an outlet conduit 55 along direction D2. The inlet conduit 54 is fluidly connected to an inlet 501 of the heat exchanger 50 and the outlet conduit 55 is fluidly connected to an outlet 500 of the heat exchanger 50.

The heat exchanger 50 includes a bypass conduit 56 allowing the fluid to flow directly from the inlet conduit 54 to the outlet conduit 55 while bypassing the heat exchanger core 51 along direction D3. In other words, the bypass conduit fluidly connects the inlet 501 to the outlet 500 while bypassing the at least one first conduit 52 of the heat exchanger core 51. This may be useful in operating conditions where a temperature of the fluid is below a certain threshold. A valve 60 is used to selectively open or close the bypass conduit 56 to allow or restrict the fluid from flowing into the bypass conduit 56. In other words, the valve 60 has an open configuration in which the inlet 501 is fluidly connected to the outlet 500 via the bypass conduit 56 and through the valve 60, and a closed configuration in which the fluid flow from the inlet 501 to the outlet 500 via the bypass conduit 56 is blocked by the valve 60. It will be appreciated that when the valve 60 is in the open configuration, the inlet 501 may remain fluidly connected to the outlet 500 via the at least one first conduit 52 of the heat exchanger core 51. However, because a flow resistance through the heat exchanger core 51 is expected to be more than a flow resistance through the bypass conduit 56, the fluid may tend to naturally flow through the bypass conduit 56 while bypassing the heat exchanger core 51 even if, in some cases, no valve prevents the fluid from reaching the at least one first conduit 52 of the heat exchanger core 51.

Figure 3:
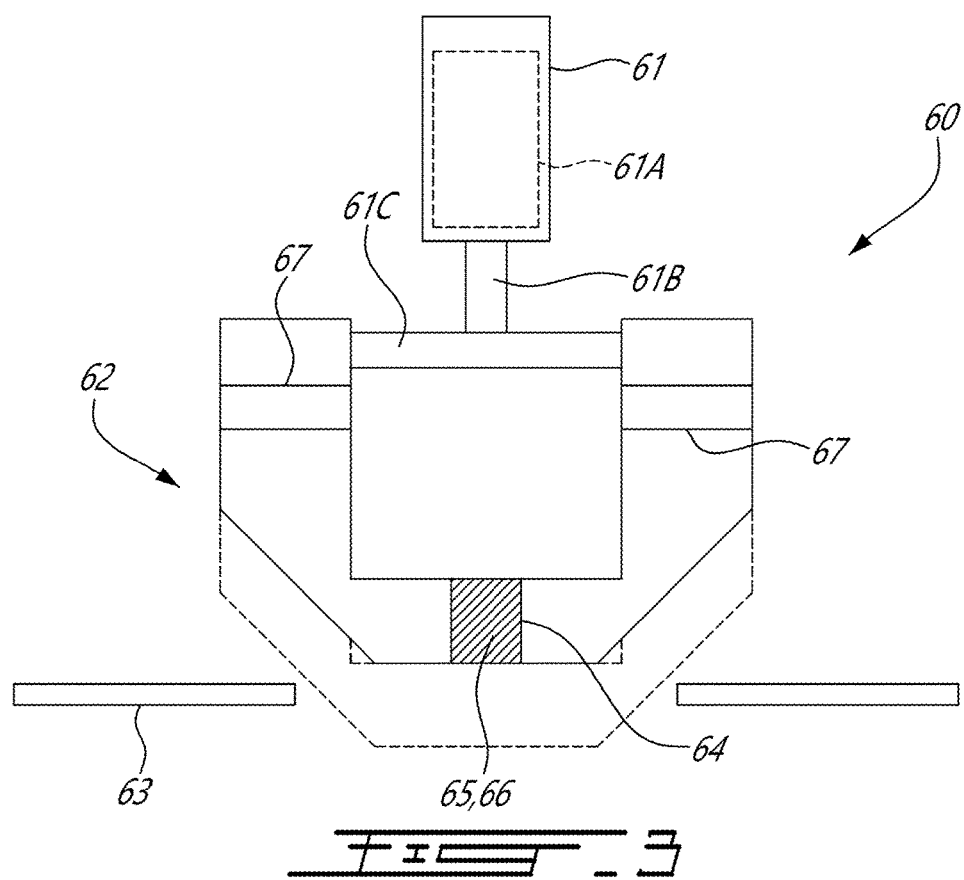
FIG. 3 is a side view of a valve for the heat exchanger of FIG. 2.

Referring now to FIG. 3, the valve 60, which may be a thermostatic valve, is shown in greater detail. The valve 60 is an actuated valve and includes an actuator 61, a valve member 62 engaged to the actuator 61, and a valve seat 63. The valve member 62 may also be referred to as a poppet valve, but any other suitable types of valve may be used. The actuator 61 in the present embodiment is a wax motor having a wax core 61A that expands in volume when heated. The wax core 61A is engaged to a shank 61B that is connected to the valve member 62 via a connecting member 61C. Other configurations are contemplated. The valve member 62 is movable from a first position shown in solid lines to a second position shown in dashed lines. The first position of the valve member 62 corresponds to the open configuration of the valve 60 whereas the second position of the valve member 62 corresponds to the closed configuration of the valve 60. The valve member 62 is sealingly engaged to the valve seat 63 in the second position. It will be appreciated that, in some other embodiments, the actuator 61 may be a linear actuator (e.g., pneumatic, hydraulic, solenoid, etc). The valve 60 may therefore be a servo valve. The features of the present disclosure may apply even if the valve 60 is actuated via an actuator operatively connected to a controller since, in case of an adverse event, electrical connection between the actuator and the controller may be compromised. However, in the context of the present disclosure, the actuator 61 is passive in that it does not require an input from a controller to move between its different positions. The actuator 61 of the present disclosure therefore moves the valve member 62 solely as a function of a temperature of a fluid surrounding said actuator 61 without any input from a controller.

In the present embodiment, a default position of the valve 60 may be the open position allowing the fluid (e.g., oil, fuel) to flow through the bypass conduit 56. As the temperature of the fluid increases with time, the wax contained within the actuator 61, which is exposed to the fluid, may start to increase in volume thereby moving the valve member 62 towards its second position to bias the valve member 62 against he valve seat 63 to close the bypass conduit 56. In such a case, a greater portion (e.g., more than 50%, 100% in some cases) is forced to flow through the heat exchanger core 51 via the at least one first conduit 52 where heat may be extracted from the fluid. Therefore, when the temperature of the fluid is above a first threshold, the valve 60 closes the bypass conduit 56.

When certifying an aircraft engine component, such as the heat exchanger 50, the component fluid operating conditions that must be considered for fire safety may result in situations whereby the flow local to the valve 60 that interfaces with external surfaces or the housing 50A of the heat exchanger 50 are stagnant. Flow internal to such a component during a fire test acts to cool its external surfaces, helping it survive exposure to a flame for the required duration of the test.

When the fluid is hot, the valve 60 will be in the closed position to force the fluid to flow through the heat exchanger core 51 so that the fluid may be cooled down. This may however result in no fluid flowing through the bypass conduit 56. Since the bypass conduit 56 may define part of the housing 50A, or be in proximity of the housing 50A, of the heat exchanger core 51, a flame impinging on the housing 50A and bypass conduit 56 may result temperature of said housing 50A exceeding a given threshold, which is undesirable. Stated differently, during exposure to a fire, the internal stagnant fluid local to the valve 60 may be expected to increase well beyond the normal operating temperature range to temperatures distinctly higher as it is heated by the external flame. Heat exchangers are typically constructed of aluminum alloys, which have melting temperatures below the temperature of the flame expected in the event of a fire. Internal cooling flows are therefore useful in removing energy from the location where the flame is impinging on the component in order to maintain the material temperatures below its structural capabilities.

The valve 60 of the present disclosure includes a feature allowing bypass flow within the bypass conduit 56 (FIG. 2) to cool the bypass conduit 56 and the housing 50A. This flow may then ensure the housing temperature remains within acceptable limits.

The valve 60 of the present disclosure may at least partially alleviate this drawback. In the present embodiment, the valve member 62 includes an auxiliary passage 64 blocked by a blocking device 65. The blocking device 65 may be positioned in any suitable way as to overlap the auxiliary passage 64. Herein, "overlap" implies that the auxiliary passage 64 is closed or blocked by the blocking device 65. The valve member 62 further includes outlet passages 67, two in the embodiment shown, but more or less may be used. Depending of the configuration, these outlet passages 67 may be omitted. In the embodiment shown, the auxiliary passage 64 is defined by an aperture extending through the valve member 62. The blocking device 65 herein corresponds to a thermal fuse 66. The blocking device 65 seals the auxiliary passage 64 to prevent the fluid to flow through the valve 60 in normal operating conditions.

Figure 4:
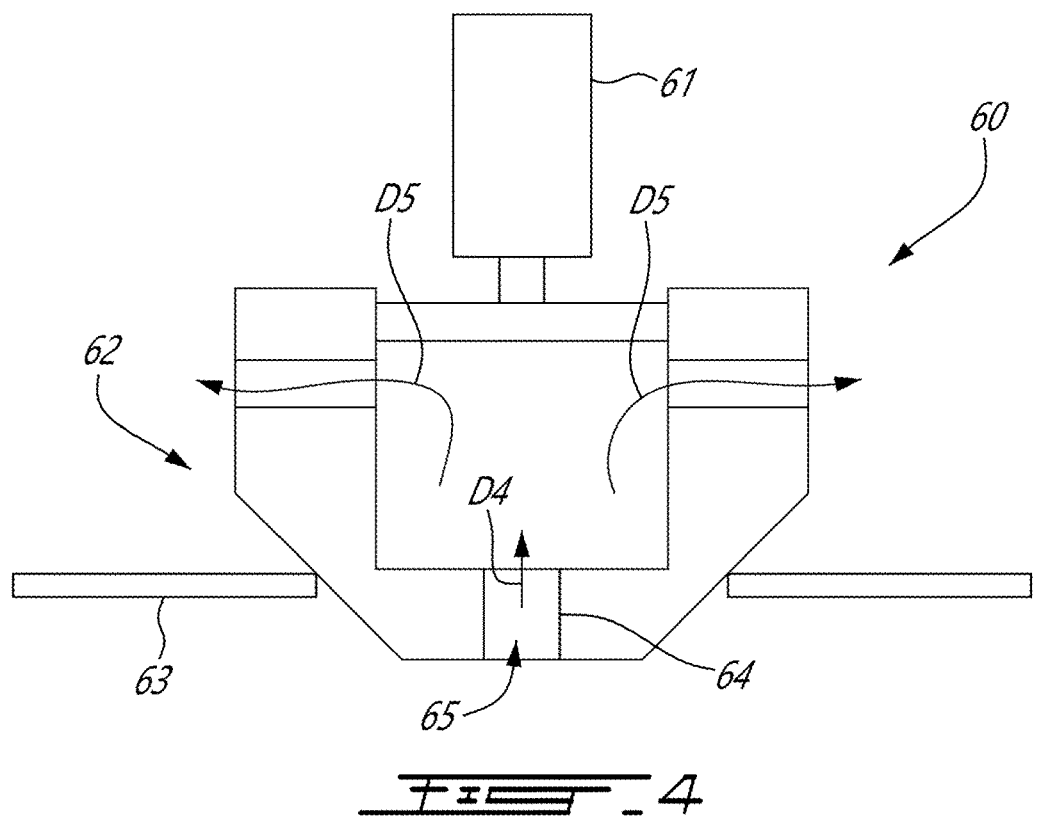
FIG. 4 is another side view of the valve of FIG. 3 shown in a closed configuration with a blocking device open.

Referring now to FIG. 4, the valve 60 is shown in its closed configuration. The thermal fuse 66 is designed to move away from the auxiliary passage 64 upon a temperature of the fluid exceeding a second temperature threshold greater than the first temperature threshold at which the valve 60 closes the bypass conduit 56 (FIG. 2). As explained above, in case of a fire, a temperature of the fluid surrounding the valve 60 may reach this temperature threshold thereby causing the thermal fuse 66 to melt. The thermal fuse 66 may therefore have a melting point below a boiling temperature of the fluid surrounding the valve 60, but above a maximum normal operating temperature of the fluid. The thermal fuse 66 may be made of wax, plastic, or any suitable material. In the case of an oil-based heat exchanger, the thermal fuse 66 may include high temperature solder that would melt when the fluid (e.g., oil) reaches the solder's melting temperature. In FIG. 4, the thermal fuse has melted thereby opening and becoming offset from the auxiliary passage 64 and allowing the fluid to flow through the valve 60 via the auxiliary passage 64 along direction D4 and out of the valve 60 via the outlet passages 67 along direction D5. Thus, the thermal fuse 66 allows the fluid to flow through the valve 60 via the auxiliary passage 64 even when the valve 60 is in the closed configuration. Put differently, the thermal fuse 66 is in a solid state and blocks the auxiliary passage 64 when a temperature of the fluid is below a predetermined temperature and in a liquid state when the temperature is above the predetermined temperature. The predetermined temperature may correspond to a maximum operating temperature of the fluid during use of the aircraft engine. For instance, the operating temperature of the fluid may vary as a function of the operating conditions (e.g., ambient temperature) and flight phase (e.g., take-off, taxi, cruise). The temperature of the fluid may range from a minimal operating temperature, when the engine is shut down and cooled down, to a maximum operating temperature during the worse conditions/phases. Aircraft manufacturers would know this maximum operating temperature and, if the temperature of the fluid is above the maximum operating temperature by a given value (e.g., 10 degrees Celsius, 20 degrees Celsius, etc), it implies that the heat exchanger may be exposed to a fire event.

In this embodiment, the normal oil operating temperature is expected to be substantially below 400 F. The thermal fuse 66 may have a melting point of about 400 F and, in some embodiments, of about 700 F. This melting point may vary depending of the material/braze material used for the thermal fuse 66.

Figure 5:
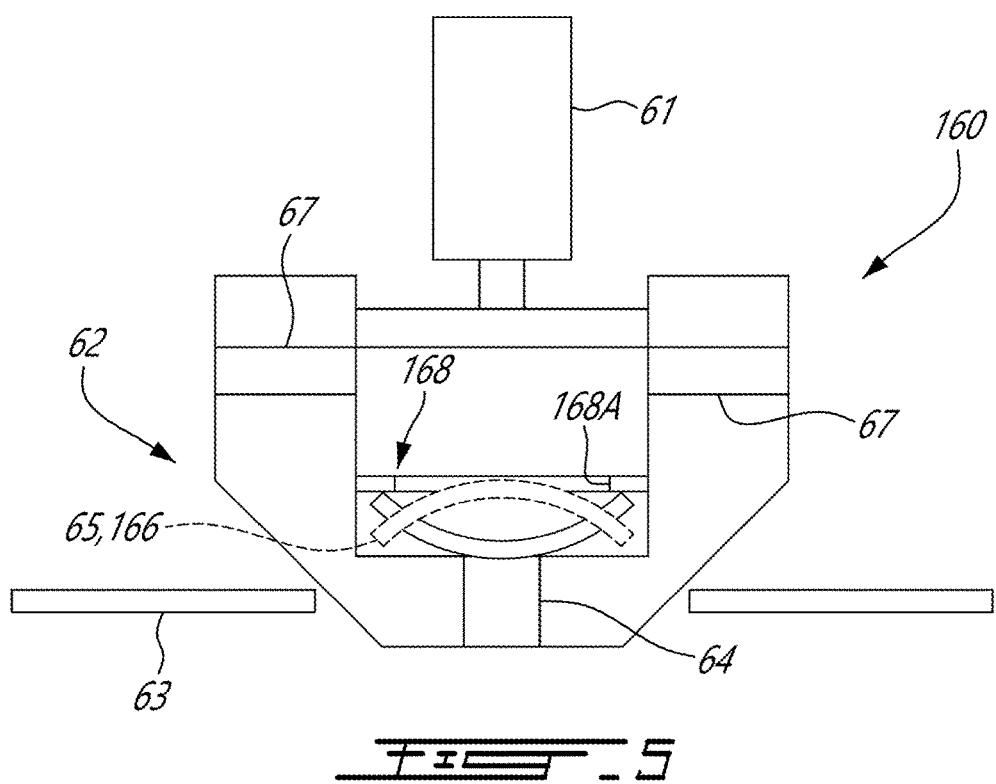
FIG. 5 is a side view of a valve in accordance with another embodiment to be used with the heat exchanger of FIG. 2.

Referring now to FIG. 5, another embodiment of a valve is shown at 160. For the sake of conciseness, only features differing from the valve 60 of FIG. 3 are described below.

In the embodiment shown, the blocking device 65 corresponds to a bi-metallic member 166 contained within a cavity of the valve member 62 (e.g., poppet valve) and retained within this cavity by a retaining member 168. The retaining member 168 defines an aperture 168A, although more than one aperture may be used, to allow the fluid that flows through the auxiliary passage 64 to exit the cavity through the retaining member 168. Other ways are contemplated to hold the bi-metallic member 166 within the cavity. For instance, the bi-metallic member may have its edge sitting within an annular recess defined by the valve member 62.

As shown in FIG. 6, the bi-metallic member 166 includes two layers, namely, a first layer 166A made of a first material and a second layer 166B made of a second material. The first material differs from the second material by their coefficient of thermal expansion. When the bi-metallic member 166 is exposed to a temperature below the second temperature threshold described above, the bi-metallic member 166 moves from a first configuration depicted with solid lines in FIG. 5 to a second configuration depicted with dashed lines in FIG. 5. In the first configuration, the bi-metallic member 166 has a first shape and covers and blocks fluid communication through the auxiliary passage 64 and, in the second configuration, the bi-metallic member 166 has a second shape and becomes offset from the auxiliary passage 64 and permits fluid communication through the valve 160 via the auxiliary passage 64 even if the valve 160 is in its closed position. As shown in FIG. 7, the bi-metallic member 166 may define apertures 166C, four illustrated, but more or less is contemplated, via which the fluid may flow through the bi-metallic member 166. In some embodiments, the bi-metallic member 166 may be devoid of aperture and fluid may flow around the bi-metallic member to reach the bypass conduit 56.

Therefore, in use, when the temperature of the fluid exceeds a first threshold, the valve 160 may move from its open configuration to its closed configuration to force the fluid to flow through the heat exchanger core 51 (FIG. 2). In case of a fire, the temperature of the fluid may exceed a second threshold at which the bi-metallic member 166 may move from its first configuration shown in solid lines in FIG. 5 and it which the bi-metallic member 166 blocks the auxiliary passage 64 to its second configuration shown in dashed lines in FIG. 5 and in which the bi-metallic member 166 is offset from the auxiliary passage 64. At which point, the fluid may flow through the valve member 62 via the auxiliary passage 64, via the apertures 166C defined through the bi-metallic member 166, via the aperture 168A defined through the retaining member 168, and out of the valve 160 via the outlet passages 67. Thus, even when the valve 160 is in its closed configuration, when the temperature of the fluid becomes excessive (e.g., greater than a maximal operating temperature of the fluid), the bi-metallic member 166 allows a cooling flow of the fluid to reach the bypass conduit 56 (FIG. 2) for maintaining it within acceptable temperatures.

It will be appreciated that, in another embodiment, the blocking device 65 may be any suitable means able to block fluid communication through the valve member 62 when the temperature of the fluid is below the second threshold and to allow the fluid to flow through the valve member 62 when the temperature becomes above the second threshold. This means may include, for instance, a thermal fuse as described above, the bi-metallic member, a memory alloy movable between two different shapes as a function of temperature, and so on.

Referring now to FIG. 8, a method of mitigating effects of excessive temperature of a fluid flowing through the heat exchanger 50 is shown at 800. The method includes flowing the fluid through the bypass conduit 56 thereby bypassing the heat exchanger core 51 when a temperature of the fluid is below a temperature threshold at 802; blocking the bypass conduit 56 with the valve 60, 160 to force the fluid to flow through the heat exchanger core 51 to exchange heat with another fluid when the temperature of the fluid is above the temperature threshold at 804; and allowing the fluid to flow into the bypass conduit 56 via the auxiliary passage 64 of the valve member 62 of the valve 60, 160 when the temperature is above a maximum operating temperature of the fluid.

As shown in FIG. 4, the allowing of the fluid to flow into the bypass conduit 56 via the auxiliary passage 64 at 806 includes melting the thermal fuse 66 overlapping the auxiliary passage 64. The thermal fuse 66 has a melting point above the maximum operating temperature of the fluid.

As shown in FIG. 5, the allowing of the fluid to flow in to the bypass conduit 56 via the auxiliary passage 64 includes changing a shape of the bi-metallic member 166 from a first shape in which the bi-metallic member blocks the auxiliary passage 64 to a second shape in which the bi-metallic member is offset form the auxiliary passage 64.

The present disclosure therefore presents a novel bypass valve feature that may not interfere with the thermostatic bypass valve functionality during normal operation but may allow for bypass flow in the event of a fire. This may prevent damage to the heat exchanger and may prevent leakage of flammable fluid out of the heat exchanger. Having a valve member provided with a blocking device (e.g., thermal fuse, bi-metallic member) may greatly reduce cyclic stresses that the blocking device would have to service compared to a configuration in which a blocking device is part of a valve seat. Having the blocking device as part of the valve member may greatly reduce the reliability penalty that might be introduced by the inclusion of the blocking device.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A heat exchanger, comprising:
    a heat exchanger core having an inlet, an outlet, at least one first conduit fluidly connecting the inlet to the outlet, and at least one second conduit in heat exchange relationship with the at least one first conduit;
    a bypass conduit fluidly connecting the inlet to the outlet while bypassing the at least one first conduit; and
    a valve in fluid communication with the bypass conduit, the valve having:
        a valve member movable between a closed position in which fluid communication through the valve and via the bypass conduit is blocked by the valve member and an open position in which fluid communication through the bypass conduit and through the valve is permitted by the valve member, the valve member defining an auxiliary passage, and
        a thermal fuse overlapping the auxiliary passage and blocking fluid communication through the valve member via the auxiliary passage, the thermal fuse having a melting temperature above a predetermined temperature of the fluid.

2. The heat exchanger of claim 1, wherein the thermal fuse is in a solid state and blocks the auxiliary passage when a temperature of the fluid is below the predetermined temperature and in a liquid state when the temperature is above the predetermined temperature.

3. The heat exchanger of claim 1, wherein the valve member is in the closed position when a temperature of the fluid is above a first threshold less than the predetermined temperature of the fluid.

4. The heat exchanger of claim 1, wherein the valve member is a poppet valve.

5. The heat exchanger of claim 4, wherein the auxiliary passage is an aperture defined through the poppet valve.

6. The heat exchanger of claim 5, wherein the thermal fuse is contained within the aperture.

7. The heat exchanger of claim 1, wherein the thermal fuse includes one or more of wax, plastic, and a soldering material.

8. The heat exchanger of claim 1, wherein the valve includes an actuator engaged to the valve member, the actuator being a passive actuator moving the valve member between the closed position and the open position as a function of the temperature of the fluid.

9. An aircraft engine, comprising:
a fuel-oil heat exchanger, having:
a heat exchanger core having an inlet, an outlet, at least one first conduit fluidly connecting the inlet to the outlet, and at least one second conduit in heat exchange relationship with the at least one first conduit;
a bypass conduit fluidly connecting the inlet to the outlet while bypassing the at least one first conduit; and
a valve in fluid communication with the bypass conduit, the valve having:
a valve member movable between a closed position in which fluid communication through the valve and via the bypass conduit is blocked by the valve member and an open position in which fluid communication through the bypass conduit and through the valve is permitted by the valve member, the valve member defining an auxiliary passage, and
a blocking device overlapping the auxiliary passage and blocking fluid communication through the valve member via the auxiliary passage, the blocking device offset from the auxiliary passage when a temperature of fuel or oil flowing through the heat exchanger core is above a predetermined temperature of the fuel or the oil.

10. The aircraft engine of claim 9, wherein the blocking device is a thermal fuse being in a solid state and blocking the auxiliary passage when the temperature of the fuel or the oil is below the predetermined temperature and in a liquid state when the temperature is above the predetermined temperature.

11. The aircraft engine of claim 10, wherein the auxiliary passage is an aperture defined through the valve member.

12. The aircraft engine of claim 11, wherein the thermal fuse is contained within the aperture.

13. The heat exchanger of claim 11, wherein the thermal fuse includes one or more of wax, plastic, and a soldering material.

14. The aircraft engine of claim 9, wherein the valve member is in the closed position when the temperature is above a first threshold less than the predetermined temperature.

15. The aircraft engine of claim 9, wherein the valve member is a poppet valve.

16. The aircraft engine of claim 9, wherein the valve includes an actuator engaged to the valve member, the actuator being a passive actuator moving the valve member between the closed position and the open position as a function of the temperature.

\* \* \* \* \*